UNITED STATES PATENT OFFICE.

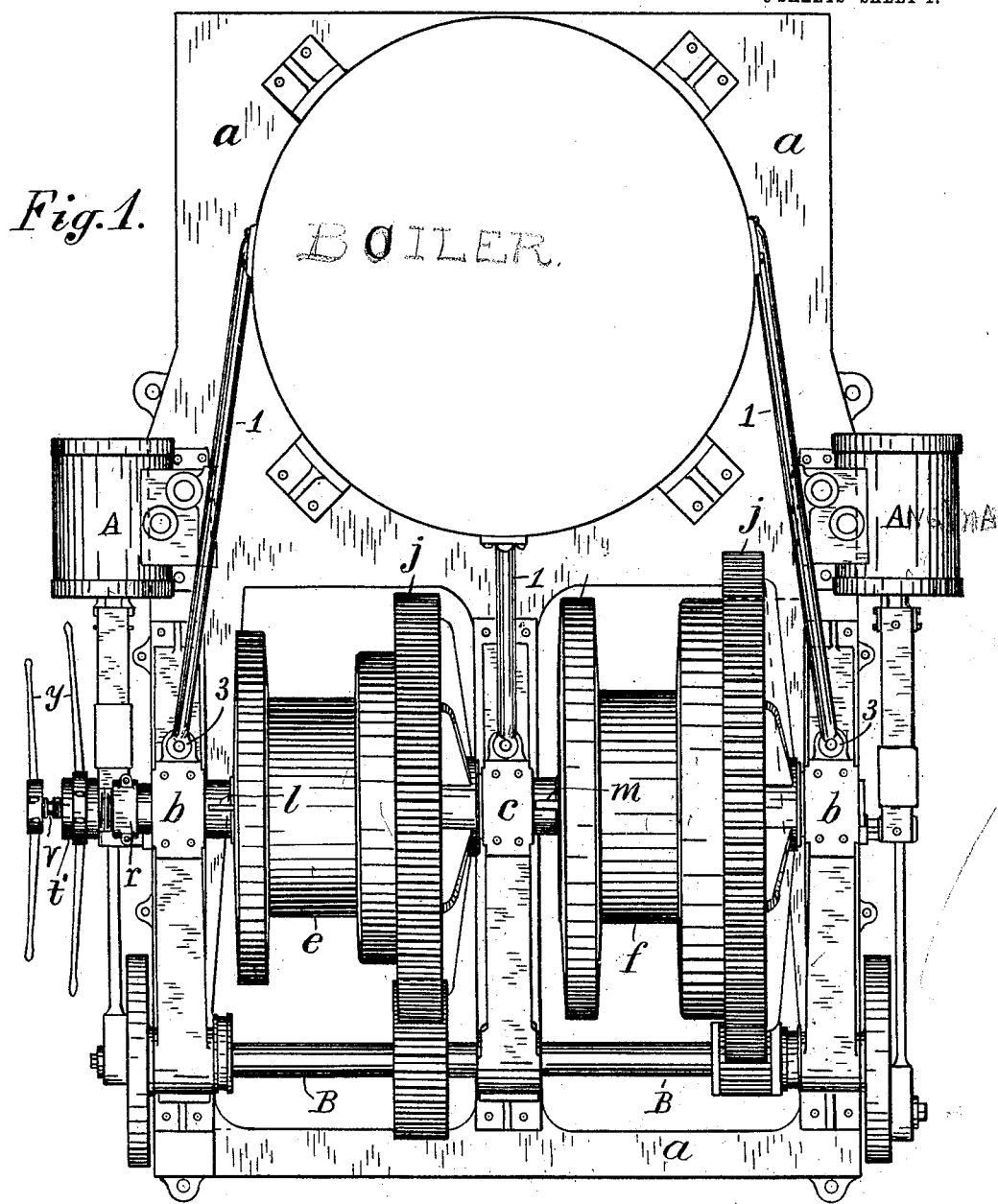

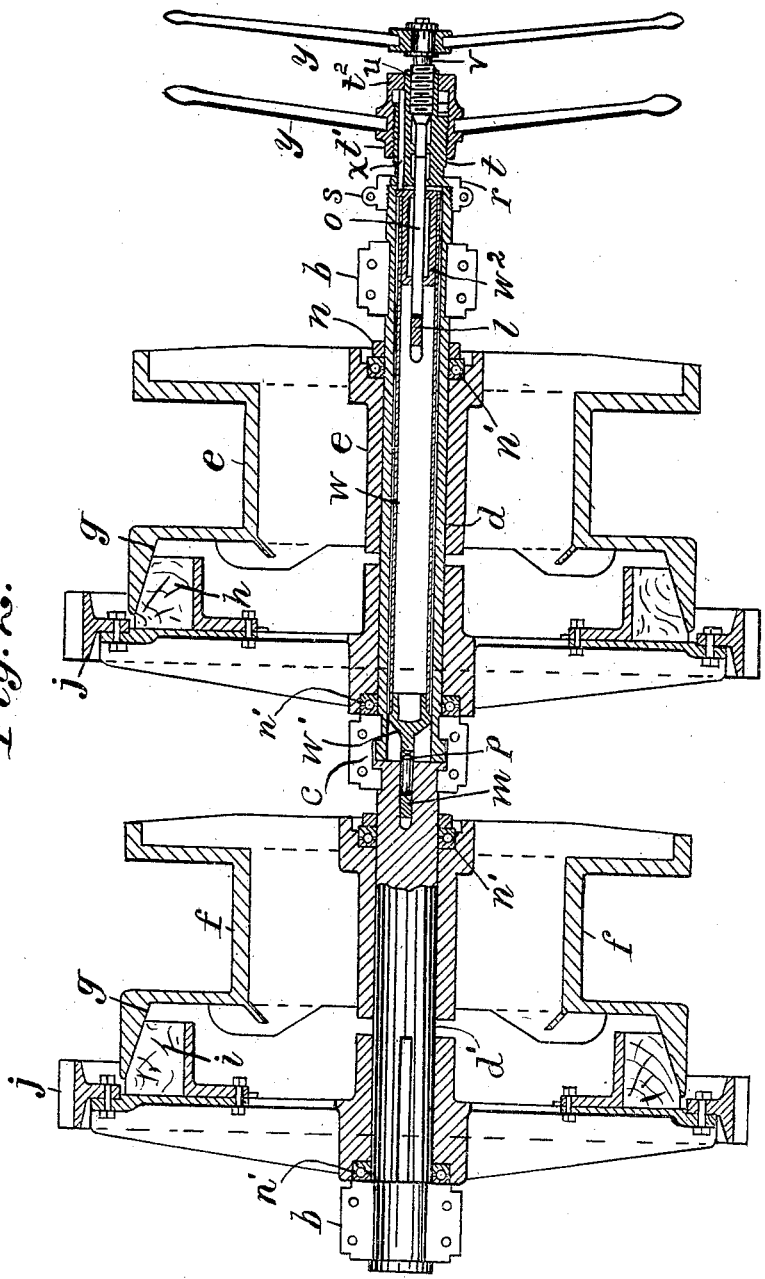

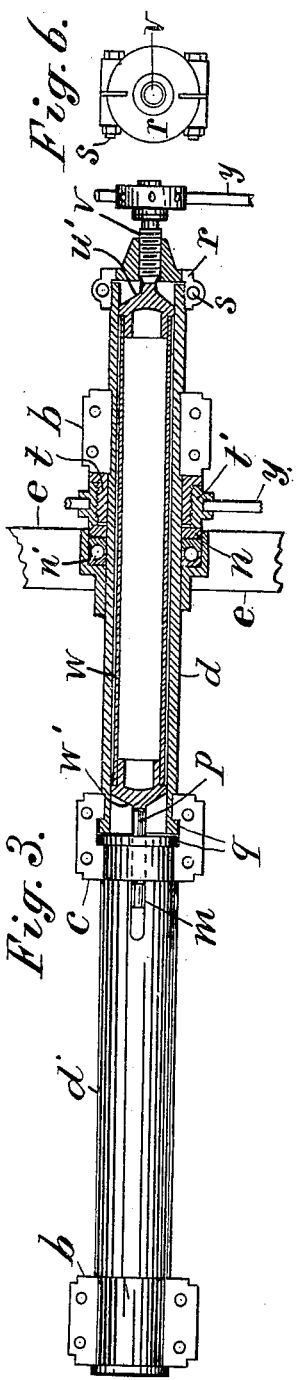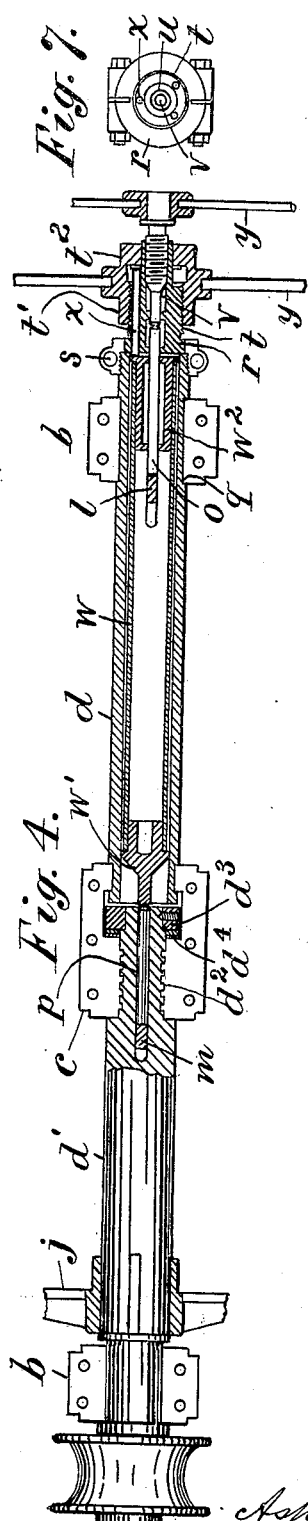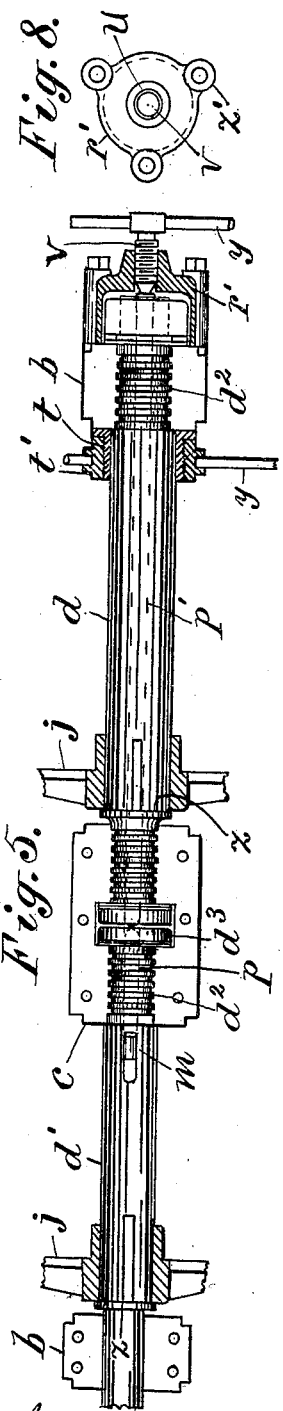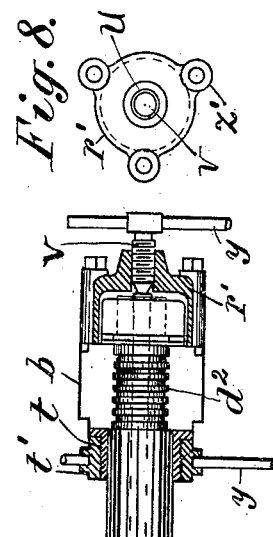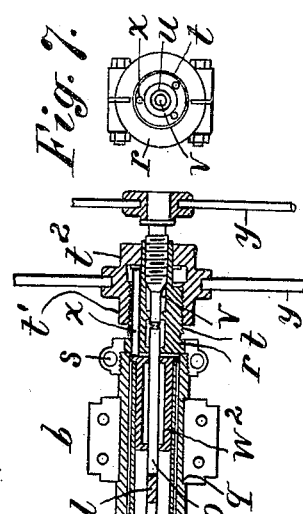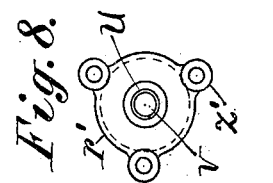

ASHER LAMBERT, OF NEWARK, NEW JERSEY.

DUPLEX THRUST DEVICE FOR FRICTION-CLUTCHES.

938,772.  Specification of Letters Patent.  Patented Nov. 2, 1909.

Application filed February 27, 1909. Serial No. 480,321.

*To all whom it may concern:*

Be it known that I, ASHER LAMBERT, a citizen of the United States, residing at No. 1 Johnson avenue, Newark, county of Essex, and State of New Jersey, have invented certain new and useful Improvements in Duplex Thrust Devices for Friction-Clutches, fully described and represented in the following specification and the accompanying drawings, forming a part of the same.

The present invention relates to means for actuating the clutch-mechanisms of hoisting machine drums in cases where two drums are mounted upon the same axial line. Great economy of space in the framing of a hoisting machine is secured by thus mounting two drums, but in such cases it has been heretofore common to actuate the clutch of each drum by a clutch-pin in the shaft-end nearest to such clutch; so that if both clutches were manipulated by a single operator he could only actuate the clutch-pin farthest from him by connections extended across the entire width of the frame, at one side of the gears and flanges of the drums.

The object of the present invention is to avoid such lengthy outside connections by making the shaft hollow or tubular within one of the drums and extending connections through such hollow shaft, to actuate the clutch-pin of the other drum, by which means both the clutches can be actuated independently from one end of the shaft and without the use of any outside connections.

The construction comprises various details of construction, including the division of the shaft within a bearing between the two drums to allow the removal of either drum from its bearings separately, the gripping of one or both of the shaft-sections in its bearings to hold it stationary with the shaft and its clutch revolving thereon; the connection of a so-called "claw" with the outer bearing which carries the hollow shaft, or directly with the end of the hollow shaft, and furnishes such a "claw" with external and internal threads upon which internal and annular screws can be fitted and operated directly upon pins inserted through the "claw" and having connections through the tubular shaft to actuate the clutches of the two drums.

It is common in hoisting machines to fasten a so-called "claw" upon the outer bearing of the drum and insert a thrust-screw through the center of the "claw" to move a central thrust-pin or clutch-pin and thus actuate the clutch of a drum upon the shaft; but in the present invention an additional series of push-pins is inserted longitudinally through the "claw" around the center screw, and operated with separate connections to actuate a clutch separate from that actuated by the central push-pin.

Instead of applying the two clutch-shifters to the extreme end of the shaft, one of the shifters may be mounted between the outer bearing and the adjacent end of the drum, and operated by an annular screw or nut to actuate the adjacent drum-clutch, while the other is actuated through the interior of the shaft by a central clutch-pin.

The invention may be applied to a shaft in one piece, or divided into sections to facilitate the removal of each drum from the frame separately, and the shaft or either of its sections may be stationary or rotary, as preferred.

The invention will be understood by reference to the annexed drawing, in which—

Figure 1 is a plan of a hoisting engine with the improvements applied thereto; Fig. 2 is a longitudinal section of a divided shaft with two drums thereon, with the clutch-shifting means mounted upon a "claw" upon the end of the shaft; Figs. 3, 4 and 5 show modified constructions for the divided shaft and the clutch-shifters, the parts being in section at the center line of the shaft where hatched. Fig. 6 is an end view of the "claw" shown in Fig. 3; Fig. 7 an end view of the "claw" shown in Fig. 4; and Fig. 8 an end view of the "claw" shown in Fig. 5, the latter being of the form already long used.

In Fig. 1, *a* designates the bed of the hoister, *b* the bearings at the outer ends of the drums, and *c* the intermediate bearing which supports the shaft-sections *d*, *d'*, between the drums *e* and *f*.

The drums shown in Fig. 2 are of the ordinary construction to turn loosely upon the shaft and provided upon one end with a friction-cone *g* to engage a complemental cone *h* or *i* which is supported and rotated by an attached gear *j*. The gears are rotated by engines A and a pinion-shaft B. The frame also carries a boiler C.

The friction-cones form clutches when pressed together, the usual keys $l$ and $m$ being shown inserted through slots in the shaft each in contact with a collar $n$ at the ends of the drums, and each key receiving an end thrust from a manually-operated clutch-shifter by a clutch-pin $o$ or $p$. Ball-bearings $n'$ support the end thrust when the drum is clutched to its gear $j$.

In Fig. 2, the sections $d$, $d'$ of the shaft are shown divided from one another in the bearing $c$ and collared, as with collars $q$, in the bearings $b$ and $c$, to prevent end movement; and are held normally stationary by clamping-caps upon the bearings.

In Fig. 2, the shaft $d$ is shown tubular and its outer end extended beyond the bearing $b$, and a so-called "claw" $r$ is screwed upon the end of the shaft and clamped rigidly by bolts $s$ inserted through split lugs. The "claw" has a hub provided with an external thread $t$ and a boss projected from the outer end of such hub and provided with an internal thread $u$. A central thrust-screw $v$ is inserted in the thread $u$, and the loose pin $o$ is inserted between the point of the same and the key $l$, serving both as a clutch-pin and a push-pin. A loose sleeve $w$ is fitted within the tubular shaft $d$ and has upon its inner end a cone $w'$ which presses at its inner end against the loose clutch-pin $p$ which engages the key $m$.

At its outer end, the sleeve $w$ has a head $w^2$ perforated for the passage and guidance of the push-pin $o$, and three sliding studs $x$ are shown inserted through the hub of the "claw" between the inner and outer threads, and their inner ends in contacts with the head $w^2$. The sleeve acts as a push-pin for the clutch-pin $p$.

An annular screw or nut $t'$ is fitted to the external thread $t$, and has a collar $t^2$ provided upon its inner side with a hardened steel facing, to contact with the outer ends of the push-pins $x$.

The screws $v$ and $t'$ which actuate the push-pin $o$ and the sliding studs $x$ are provided with arms or handles $y$ to turn them independently. The push-pin $o$ and the key $l$ form a connection between the central screw $v$ and the clutch-mechanism upon the nearer or tubular shaft $d$; while the sliding studs $x$, the sleeve $w$, the clutch-pin $p$ and key $m$ form a connection between the annular or external screw $t'$ and the clutch-mechanisms upon the other or farther shaft.

It will be understood that the shaft $d$, the "claw" carried thereby and all the clutch-shifter devices mounted upon the "claw", as well as the sleeve $w$ inside the tubular-shaft, are stationary, except when adjusted or moved by the handles $y$.

The construction thus confines the connections of the clutch-shifting devices entirely to the interior of the drum-shafts, while it provides separate means mounted at the outer end of one of the drums, and operating through the tubular shaft of the said drum, to actuate the clutches of both of the drums independently.

In Fig. 2, it will be seen that the end of the shaft $d'$ which is otherwise shown solid, is perforated centrally for the passage of the clutch-pin $p$ to its engagement with the key $m$, and this is a common arrangement in clutch-shifters for drums; but no means has been heretofore provided to operate two clutch-connections through the interior of a shaft, as is shown upon the tubular-shaft $d$.

In Fig. 2, the "claw" upon which the screw clutch-shifters are mounted is shown secured directly upon the end of the drum-shaft, and both of the clutch-shifters are mounted upon such "claw," and the annular screw or nut $t'$ is used to operate the push-pin $p$ and the key $m$ for the farther drum.

In Fig. 3, a modification is shown in which one of the clutch-shifters is mounted upon the bearing $b$ between such bearing and the end of the drum $e$. In such case, a hub having an external thread $t$ is secured rigidly to the bearing $b$, as shown in Fig. 5, and the annular nut $t'$ is constructed to press directly upon the collar $n$ which contacts with the ball-bearing at the outer end of the drum. The hub is commonly secured to the bearing by the lugs and bolts. With this construction, the sleeve $w$ acts merely as a straight push-pin, and is formed with cones $u'$ and $w'$ at opposite ends, and the screw $v$ presses upon the outer cone $u'$ when it is turned, and thus operates the clutch of the drum $f$ instead of the nearer drum $e$, as with the construction shown in Fig. 2.

In Figs. 2 and 3, the sections $d$, $d'$ of the drum-shaft are both held stationary and do not therefore require any extended wearing surface where they are supported in the bearings; and it is obvious that the removal of the caps of the bearings permits either of the drums and drum-gears, with the shaft-section upon which it revolves, to be removed from the bearings for repairs or replacement without disturbing the other drum and its gearing connections.

Fig. 4 shows an alternative construction for the sectional shaft and its bearings, in which the section $d$ of the shaft is shown stationary and the section $e$ adapted for rotation, in which case the gear $j$ would be attached to the shaft-section $d'$ and a shoulder $z$ is formed upon the shaft at the back of the gear to resist the end thrust, such gear and shaft revolving continuously.

Fig. 4 shows the bearing $c$ of greater length than in Fig. 2 or Fig. 3 to compensate for wear, and the end of the shaft $d'$ formed with annular grooves and rings $d^2$ and with an enlarged collar $d^3$ upon the end, with anti-friction washers $d^4$ between the same and the inner end of the bearing.

In Fig. 4 the clutch-shifters are shown of the same organization as in Fig. 2.

Fig. 5 shows the shaft with both its sections made to revolve in their bearings and the gears $j$ attached thereto, the bearings being made of sufficient length to provide for wear upon the journals and all of the shaft-journals which require it formed with the annular grooves and rings $d^2$ to resist end thrust.

The key $m$ for the farther drum $f$ is shown operated by a long push-pin $p'$ extended entirely through the shaft-section $d$ and pressed against the clutch-pin $p$ by a central screw $v$, but the "claw" $r'$ to support such screw is secured to the bearing $b$ in order to hold it stationary, as the adjacent shaft-section $d$ revolves and could not, therefore, carry the "claw". Fig. 8 shows the ordinary construction of such "claws", with three feet $z'$ to bolt to the bearing $b$. Where revolving shafts are thus used, one of the clutch-shifters is mounted upon the inner side of the bearing $b$, as shown at $t$, $t'$, in Figs. 3 and 5; and its rotary member presses directly upon the collar $n$ at the end of the drum.

The illustrations show that the invention is applicable to actuate the clutches of two drums mounted upon the same axial line, without any external connections from the clutch-shifters to the drums, thus enabling an operator at the end of one drum to operate both the clutches by direct internal connections thereto.

The shaft may obviously be continuous instead of divided in the center bearing, and a center bearing can be dispensed with if such a continuous shaft be made of suitable strength to carry two drums and their clutching appliances.

Having thus set forth the nature of the invention what is claimed herein is:

1. The combination, with two drums mounted adjacent upon the same axial line, of gearing to rotate the drums, two clutches for engaging the gearing with the drums independently, two separate clutch-shifters mounted at the outer end of one of the drums for actuating the two clutches, and one of the shifters having means operating through the center of the said drum to actuate the clutch of the other drum.

2. The combination, with two drums and a divided shaft supporting them in the same axial line, of gearing to rotate the drums, two clutches upon the shaft for engaging the gearing with the drums independently, two screw clutch-shifters at the outer end of one of the drums, provided with connections inside the shaft to operate upon the two clutches, and means for turning the two screws separately to clutch either of the drums with the gearing independently of the other drum.

3. The combination, with two drums and a divided shaft supporting them in the same axial line, of gearing to rotate the drums, two clutches upon the shaft for engaging the gearing with the drums independently, two screw clutch-shifters at the outer end of one of the drums to operate the clutches, the shaft within said drum being tubular and being supported by a bearing near the end of the drum, a stationary "claw" at the end of said tubular-shaft, one of such clutch-shifters consisting of a central screw carried by the "claw" with connection to one of the clutches, and the other clutch-shifter consisting of a male screw held stationary upon the said bearing with a nut movable thereon, and connection from said nut to the other clutch, whereby either drum may be clutched to the gearing independently.

4. The combination, with two drums and a divided shaft supporting them in an axial line, of gearing to rotate the drums, two clutches upon the shaft for engaging the gearing with the drums independently, two screw clutch-shifters at the outer end of one of the drums to operate the clutches, the shaft within said drum being tubular, a stationary "claw" at the end of said tubular-shaft provided with external and internal screw-threads with internal and external screws fitted to the said threads, and means operating through the tubular-shaft for connecting the two clutches with the external and internal screws, whereby either drum may be clutched to the gearing independently of the other.

5. The combination, with two drums and a divided shaft supporting them in an axial line, of gearing to rotate the drums, two clutches upon the shaft for engaging the gearing with the drums independently, two screw clutch-shifters at the outer end of one of the drums to operate the clutches, the shaft within said drum being tubular, a stationary "claw" at the end of said tubular shaft provided with external and internal screw-threads, sliding-studs inserted longitudinally through the "claw" between such internal and external screw-threads, and means connecting such studs with the clutch of one of the drums, an inner push-pin in the center of the shaft with connections to the other clutch, an internal screw in the center of the "claw" to press upon the inner push-pin, and an annular screw or nut fitted to the external thread upon the "claw" and having a collar to press upon the sliding-studs, whereby the clutches are independently actuated by two screws at one end of the shaft.

6. The combination, with two drums and a divided shaft supporting them in an axial line, of gearing to rotate the drums, two clutches upon the shaft for engaging the gearing with the drums independently, two screw clutch-shifters at the outer end of one of the drums to operate the clutches, the shaft within said drum being tubular, a bearing clamping such shaft at the outer end of the drum with the shaft projected through the same, a "claw" secured upon the end of the shaft and provided with external and internal screw-threads, internal and annular screws fitted to such threads, and connections from such screws through the interior of such tubular shaft to the two clutches, to connect the drums separately with the gearing.

7. The combination, with two drums mounted in an axial line, of a center bearing between the drums, and bearings at their outer ends, a sectional shaft mounted removably in the said bearings with the division of the sections in the center bearing each section carrying one of the said drums, a rotating clutch mounted upon each of the said shafts to rotate one of the drums, two clutch-shifters mounted upon one of the outer bearings with connections for engaging the two shifters with the two clutches independently, the shaft-section in said bearing being tubular, and one of said connections arranged and operated through the tubular shaft-section of one drum to actuate the clutch of the other drum upon the other shaft-section.

8. The combination, with two drums mounted in an axial line, of a center bearing between the drums, and bearings at their outer ends, a sectional shaft with its sections mounted removably in the said bearings with the division of the sections in the center bearing, and the ends of the sections being collared in the said center bearing to resist end thrust, a drum mounted to turn upon each section, a rotating clutch upon each section, two clutch-shifters mounted upon one of the outer bearings the shaft-section in such bearing being tubular, and connections from the shifters for actuating the two clutches separately, one of said connections extending through the nearer tubular section to actuate the clutch upon the farther shaft-section.

9. The combination, with two drums mounted in an axial line, of a center bearing between the two drums and bearings at their outer ends, a sectional shaft with its sections mounted removably in the said bearings with the division of the sections in the center bearing and the ends of the sections both collared in the said center bearing to resist end thrust, at least one of the sections being normally clamped in the bearings to hold them stationary, and one section being tubular and projected beyond the outer bearing and having a "claw" secured thereon and provided with external and internal screw-threads, a drum and a rotary clutch fitted to turn upon each of the sections, an inner push-pin and thrust-screw extended through the center of the "claw" with connections to the clutch upon the tubular shaft, sliding studs inserted through the "claw", with connection to the clutch upon the farther shaft, an annular nut or screw fitted to the external thread of the "claw" to actuate such sliding studs, and means for turning the thrust-screw and the annular nut independently, as and for the purpose set forth.

10. The combination, with two drums mounted in an axial line with bearings between and outside the drums, of a divided shaft with one section stationary and tubular and the other section rotary and projected beyond its outside bearing and provided with a winch, clutches upon the respective shafts for engaging the drums independently, gearing for rotating the clutches continuously, and two clutch-shifters at the outer end of the tubular shaft, one of said clutch-shifters having connections operating through the stationary tubular shaft to connect the drum with its clutch upon the rotary shaft.

In testimony whereof I have hereunto set my hand in the presence of two subscribing witnesses.

ASHER LAMBERT.

Witnesses:
 ROBT. L. HATFIELD,
 T. M. WATSON, JR.